United States Patent
Bélanger et al.

(10) Patent No.: US 10,589,187 B2
(45) Date of Patent: *Mar. 17, 2020

(54) PYROLYSIS SYSTEM FOR BIO-OIL COMPONENT EXTRACTION

(71) Applicant: Tolero Energy, LLC, Sacramento, CA (US)

(72) Inventors: Raymond Bélanger, Chilliwack (CA); Christopher Churchill, Sacramento, CA (US)

(73) Assignee: Tolero Energy, LLC, Sacramento, CA (US)

(*) Notice: Subject to any disclaimer, the term of this patent is extended or adjusted under 35 U.S.C. 154(b) by 525 days.

This patent is subject to a terminal disclaimer.

(21) Appl. No.: 13/907,494

(22) Filed: May 31, 2013

(65) Prior Publication Data
US 2014/0352204 A1    Dec. 4, 2014

(51) Int. Cl.
*C10B 53/02*    (2006.01)
*B01D 5/00*    (2006.01)
(Continued)

(52) U.S. Cl.
CPC .......... *B01D 5/0057* (2013.01); *C10B 53/02* (2013.01); *C10C 5/00* (2013.01); *C10K 1/04* (2013.01);
(Continued)

(58) Field of Classification Search
CPC ........ B01D 5/0027; B01D 5/003; C10G 1/02; Y02E 50/14; Y02E 50/10; Y02E 50/32;
(Continued)

(56) References Cited

U.S. PATENT DOCUMENTS 4,324,637 A * 4/1982 Durai-Swamy ......... C10B 49/20
201/2.5
4,324,638 A * 4/1982 Durai-Swamy .......... C10G 1/02
201/2.5
(Continued)

OTHER PUBLICATIONS

PCT International Search Report (Chapter 1) dated Oct. 9, 2014 in International Application No. PCT/US2014/039853.
(Continued)

*Primary Examiner* — Jonathan Luke Pilcher
(74) *Attorney, Agent, or Firm* — Lance Kreisman; Peninsula Patent Group

(57) ABSTRACT

A system is described that includes a pyrolyzer and a primary condenser. The primary condenser is coupled to the pyrolyzer and includes an input to receive pyrolytic vapors from the pyrolyzer and a solvent. The condenser is further configured to condense the pyrolytic vapors by contacting the pyrolytic vapors with the solvent to form a condensed liquid that exits the primary condenser via an output. A capture vessel receives the condensed liquid from the condenser output. A recirculator couples the capture vessel to the primary condenser input and is configured to receive the condensed liquid from the primary condenser, and to provide at least a portion of the condensed liquid as the solvent in the primary condenser. The solvent from the bio-oil component/solvent mixture is then extracted in a solvent extraction system and returned to the quenching system.

14 Claims, 3 Drawing Sheets

(51) Int. Cl.
*C10G 1/02* (2006.01)
*C10K 1/04* (2006.01)
*C10K 1/18* (2006.01)
*C10C 5/00* (2006.01)
*C10K 1/08* (2006.01)

(52) U.S. Cl.
CPC .................. *C10K 1/08* (2013.01); *C10K 1/18* (2013.01); *C10G 1/02* (2013.01); *C10L 2290/02* (2013.01); *C10L 2290/544* (2013.01); *Y02E 50/14* (2013.01)

(58) Field of Classification Search
CPC ........... C10C 5/00; C10B 53/02; C10B 53/00; C10B 53/04; C10B 53/06; C10B 53/07; C10B 53/08
See application file for complete search history.

(56) References Cited

U.S. PATENT DOCUMENTS

| | | | | |
|---|---|---|---|---|
| 4,324,639 A * | 4/1982 | Durai-Swamy | ......... | C10B 49/20 201/2.5 |
| 4,324,640 A * | 4/1982 | Durai-Swamy | ......... | C10B 49/20 201/2.5 |
| 4,324,641 A * | 4/1982 | Durai-Swamy | ......... | C10B 49/20 201/2.5 |
| 4,324,642 A * | 4/1982 | Durai-Swamy | ......... | C10B 49/20 201/2.5 |
| 4,324,643 A * | 4/1982 | Durai-Swamy | ......... | C10B 49/20 201/2.5 |
| 4,324,644 A * | 4/1982 | Durai-Swamy | ......... | C10G 1/002 201/2.5 |
| 5,792,340 A | 8/1998 | Freel et al. | | |
| 7,819,930 B2 | 10/2010 | Adams et al. | | |
| 7,998,315 B2 * | 8/2011 | Bridgwater | ............. | C10B 53/02 201/2.5 |
| 8,436,120 B2 * | 5/2013 | Piskorz | .................... | C05D 9/00 127/37 |
| 8,940,060 B2 * | 1/2015 | Baird | ....................... | C10K 1/08 44/307 |
| 2002/0132972 A1 | 9/2002 | Giroux et al. | | |
| 2004/0108251 A1 * | 6/2004 | Gust | ....................... | C10B 49/22 208/126 |
| 2009/0126433 A1 * | 5/2009 | Piskorz | .................... | C05D 9/00 71/25 |
| 2009/0227766 A1 | 9/2009 | Bridgwater et al. | | |
| 2011/0245489 A1 | 10/2011 | Steele et al. | | |
| 2012/0285080 A1 | 11/2012 | Despen et al. | | |
| 2013/0055699 A1 | 3/2013 | Rohlfs | | |
| 2013/0152455 A1 * | 6/2013 | Baird | ....................... | C10K 1/08 44/307 |
| 2015/0107150 A1 * | 4/2015 | Belanger | .................. | C10K 1/08 44/307 |

OTHER PUBLICATIONS

Written Opinion of the International Searching Authority (Chapter 1) dated Oct. 9, 2014 in International Application No. PCT/US2014/039853.

Reply to Written Opinion dated Dec. 8, 2014 in International Application No. PCT/US2014/039853.

* cited by examiner

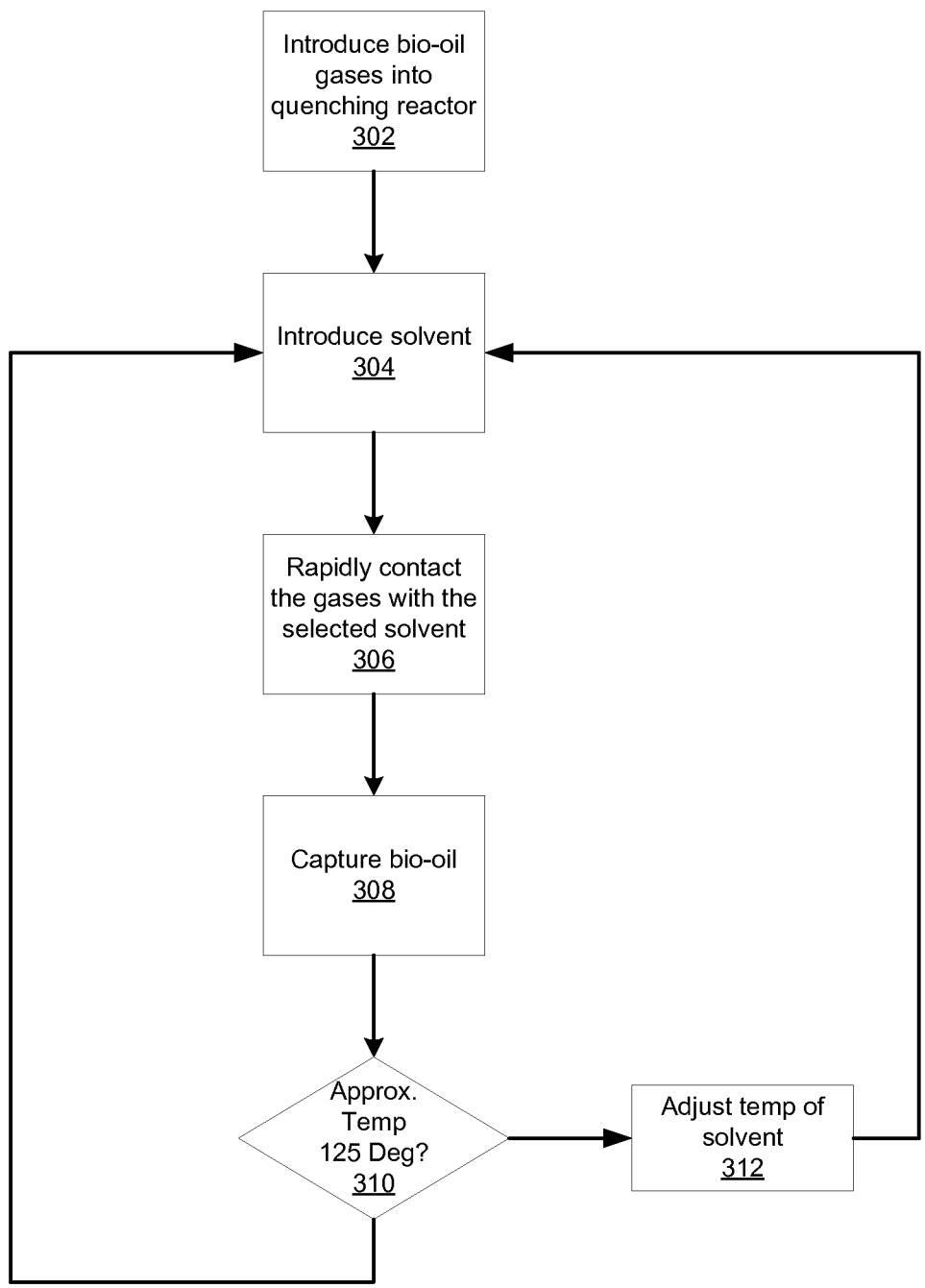

PYROLYSIS SYSTEM FOR BIO-OIL COMPONENT EXTRACTION

TECHNICAL FIELD

The disclosure herein relates to pyrolysis vapor condensation, and more specifically to bio-oil component extraction in a pyrolysis system.

BACKGROUND

Pyrolyzed vapors from "material" ("material" can consist of and/or contain petroleum compounds, plastics, tires, biomass (both vegetal and animal), solid wastes, extracts of liquid wastes, or a combination thereof) can, when condensed completely, produce a liquid known as bio-oil. The resulting raw bio-oil includes a high proportion of water and organic acids, and other thermal decomposition products from the pyrolyzed material. Raw bio-oil is often chemically unstable and typically rapidly polymerizes. Moreover the energy content or energy density of raw bio-oil is about half that of crude oil, due mostly from the amount of water and polar species contained within. Raw bio-oil is generally also very acidic and corrosive to some parts found in standard motors and turbines. Raw bio-oil often cannot be blended directly with other petroleum fuels due to its polarity as well as water content. Upgrading and de-watering raw bio-oil has, to this point, been difficult and expensive, making conventionally produced bio-oil economically unattractive.

One method for processing bio-oil vapors obtained from a slow pyrolysis process involves quenching the vapors with biodiesel in a single-pass or stage. While this method may operate acceptably for some situations, continually feeding pure biodiesel into a quenching vessel to condense the bio-oil may prove costly for long-duration processes. Further, significant volumes of biodiesel may prove impractical to employ for such a system. In addition, a slow pyrolysis technique often produces lower quantity bio-oil, therefore negatively affecting the economics of such a system. Moreover, resulting bio-oil/biodiesel fuel mixtures produced with bio-oil extracted via the single-pass process may have problems passing fuel combustion standards, such as ASTM D975 or D6751.

What is needed is a more economical and practical system and method to extract bio-oil components from pyrolyzed material.

BRIEF DESCRIPTION OF THE DRAWINGS

FIG. 3 illustrates further detail for one embodiment of the condensing of FIG. 2.

DETAILED DESCRIPTION

Examples of systems and methods are described below that provide for bio-oil component extraction from a material. In one embodiment, a system is described that includes a pyrolyzer and a primary condenser. The primary condenser is coupled to the pyrolyzer and includes an input to receive pyrolytic vapors from the pyrolyzer and a solvent. The condenser is further configured to condense the pyrolytic vapors by contacting the pyrolytic vapors with the solvent to form a condensed liquid that exits the primary condenser via an output. A capture vessel receives the condensed liquid from the condenser output. A recirculator couples the capture vessel to the primary condenser input and is configured to receive the condensed liquid from the primary condenser, and to provide at least a portion of the condensed liquid as part of or all of the solvent in the primary condenser.

Examples further provide for a method of extracting bio-oil components from vapors comprising: (a) pyrolyzing a material; (b) condensing a first amount of bio-oil component vapors produced by pyrolyzing the material with a solvent to produce a condensed liquid; and (c) recirculating at least a portion of the condensed liquid to condense a second amount of bio-oil component vapors.

In a specific example, a non-polar high boiling point solvent is used to quench bio-oil components from a material or waste material pyrolysis vapor stream. The resulting liquid is returned to the quenching zone to quench more pyrolysis vapors and load the solvent with more bio-oil components. During the quenching process, an injection rate and temperature of the quenching solution are controlled to obtain a particular quantity and quality of the resulting loaded solution. Moreover, in some embodiments, chemical species such as acetone, acetaldehyde, water and acetic acid may be separated in situ by controlling the temperature.

In another example, a bio-oil component solution is further concentrated by extracting the solvent mixed with bio-oil components and returning the solvent to the quenching system loop. A small proportion of solvent may be preserved to improve some characteristics like viscosity and solubility, for example, of the final liquid.

In a third example, a liquid is produced from pyrolysis vapors which can be used directly in conjunction with a wide variety of fuels.

System Description

Although illustrative embodiments are described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments.

Figure 1:
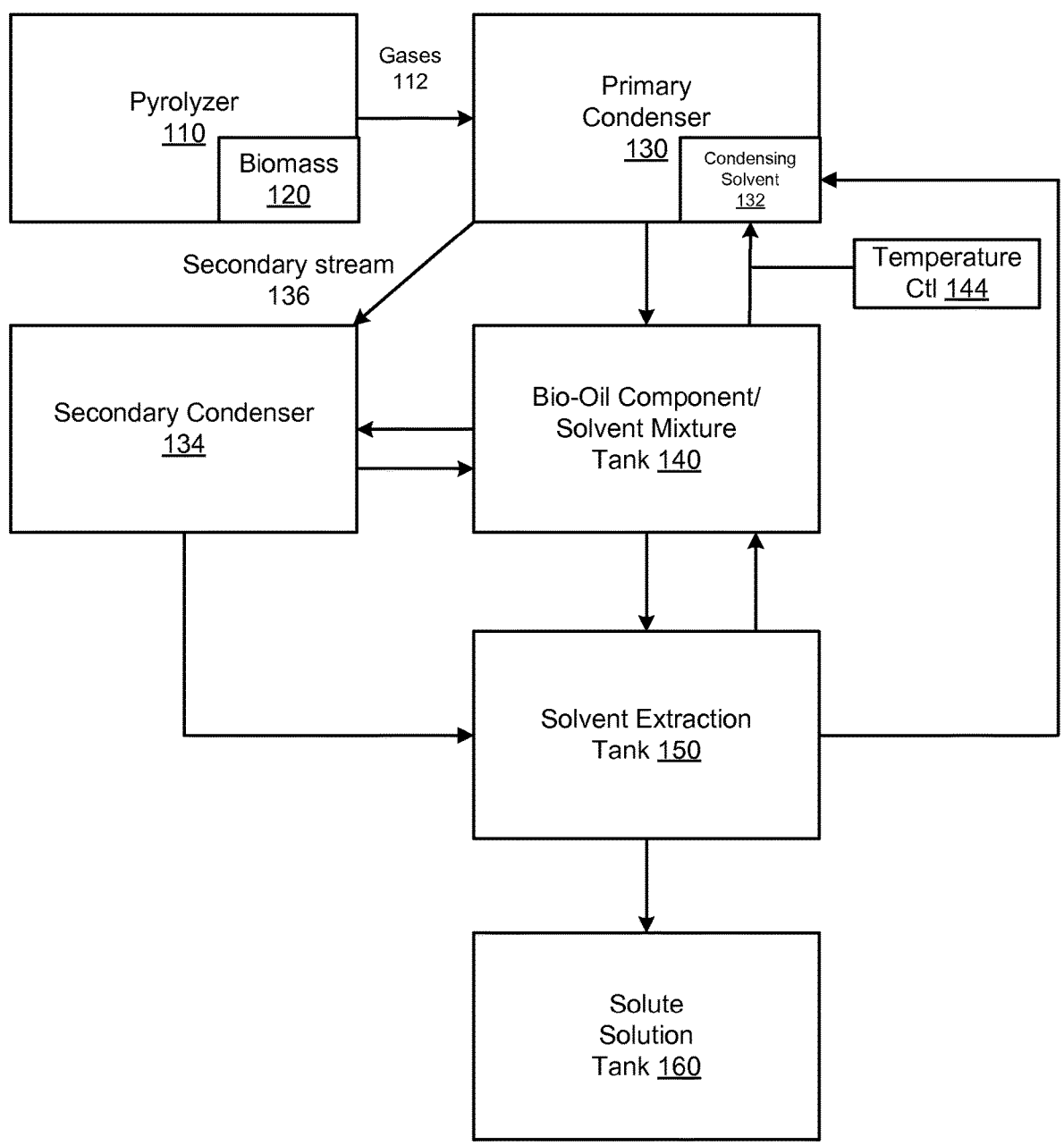
FIG. 1 illustrates a system for extracting bio-oil components from pyrolyzed material.

FIG. 1 illustrates a system, generally designated 100, for extracting bio-oil components from pyrolyzed material. The system 100 includes a pyrolizer 110 where a material 120 is exposed to heat with little or no oxygen present. Embodiments recognize that fast and flash pyrolysis (e.g. greater than 1000° C./min heating rates) may provide, for example, generation of higher liquid yields of better quality of bio-oil component/solvent solution 140. The material 120 fed to the pyrolizer can consist of and/or contain petroleum compounds, plastics, tires, biomass (both vegetal and animal), solid wastes, extracts of liquid wastes, or a combination thereof, and the like.

Gases 112 generated by the pyrolysis of the material 120 are directed from the pyrolyzer 110 to an input of a primary condenser 130. The condenser causes bio-oil component vapor to condense to a liquid form of bio-oil components. In one embodiment, the primary condenser takes the form of a quenching chamber. Other embodiments may employ non-quenching techniques. In a specific quenching embodiment, a second input to the condenser receives a condensing solvent 132. The solvent is generally sprayed onto the gases (pyrolysis vapors) to form a bio-oil component/solvent mixture that is stored in a bio-oil component/solvent mixture tank 140.

Further referring to FIG. 1, for one embodiment, a recirculator 142 couples the inlet to the condenser 130 to an outlet of the mixture tank 140 to feed at least a portion of the bio-oil component/solvent mixture back to the condenser 130. The fed back mixture is then used to quench additional bio-oil component vapors as more fully explained below. In some embodiments, a temperature controller 144 may be employed to control the temperature of the mixture going into the condenser to extract an optimal percentage of bio-oil components from the vapor stream.

With continued reference to FIG. 1, bio-oil component vapors that fail to condense in the primary condenser 130 may be directed to an input of a secondary condenser 134 along a secondary path 136. A condensing process similar to that of the primary condenser 130 is carried out in the secondary condenser 134. A resulting liquid bio-oil component/solvent mixture from the secondary condenser is fed from an outlet to the mixture tank 140. A secondary recirculator extends from the mixture tank 140 back to the secondary condenser 134 to feed the bio-oil component/solvent mixture as the quenching agent in the secondary condenser.

The bio-oil component/solvent mixture tank 140 may maintain a consistent volume, and includes a third outlet that feeds a solvent extraction tank or vessel 150. As more fully explained below, the solvent component of the bio-oil component/solvent mixture may be separated from the mixture, and returned to the mixture tank 140. The solvent extracted from the mixture can also be returned to the line going from the bio-oil component/solvent mixture tank to the condenser 130. The resulting bio-oil component liquid may then be fed to a solute solution tank 160, where further purification or refining may take place.

For some embodiments, the characteristics of the condensing solvent can be selected to improve the component separation of the pyrolytic gases 112. For example, the solvent polarity may provide better separation of chemicals of interest, and as such may be selected based on the intended end use. For example, in the case of a fuel compatible mixture, a non-polar or substantially non-polar solvent may be used to capture non-polar chemical species from the bio-oil components which are miscible in standard petroleum fuels.

Polar solvents can also be used as the condensing solvent. For example, use of a polar solvent as condensing solvent can cause polar compounds to be trapped, causing the non-polar species to separate in a different layer from the polar solvent. The non-polar species can then be separated. Ionic solvents can also be used and similarly removed, recycled and reused.

The primary condenser 130 may further be injected with reagents, such as, for example, steam, hydrogen, or other catalysts. The reagents can be injected into the condenser 130 or blended with the condensing solvent when applicable. The heat present in the pyrolysis vapors or condenser 130 can then be utilized to activate a chemical reaction.

The boiling and melting points of the solvent can also be varied. In an example, the solvent can be selected to have a melting point lower than that of room temperature to avoid mechanical issues, such as clogging of the condensation and transfer systems. The solvent may also be selected to have a low melting point to avoid freezing during normal ambient storage. Additionally, the boiling point of the solvent can be selected based on the use of the condenser 130 and solvent, for purpose of condensation. The solvent can further be selected to have a minimum of decomposition during condensation.

The solvent can be selected to have a boiling temperature low enough to be distilled under normal or reduced pressure while maintaining captured bio-oil components. For example the solvent can be selected from the following chemical groups; alkanes, alkenes, aromatics, alcohols, ketones, aldehydes, fatty acids, fatty esters, triglycerides, esters, their derivatives, and a combination thereof. The solvent can also include a pure solvent mixture. More complex mixtures like biodiesel, vegetable oil, motor oil, and hydrocarbon distillation cuts can also be used. Alternatively the solvent can also be ionic liquids some of which can be recycled via atmospheric or vacuum distillation.

After gases 112 are quenched by condensing solvent, a bio-oil component/solvent solution is formed and contained by the bio-oil component/solvent solution mixture tank 140. The bio-oil component/solvent solution includes components from the gases 112, particularly bio-oil components. The bio-oil component/solvent solution can be captured for a maximum recycling yield as well as minimizing the losses downstream and avoid contamination in the rest of the system.

The removal of heat by condensation is obtained when the heat of the gases 112 is transferred to the solvent. For example this can be accomplished by rapidly contacting the pyrolysis gases 112 with the solvent in the primary condenser 130. In such examples the solvent can be sprayed in the direct path of the pyrolysis gases in a quenching process. In another example, the solvent may be introduced as a falling film with the gases 112.

As noted above, in the example of FIG. 1, the bio-oil component/solvent solution contained in the bio-oil component/solvent solution mixture tank 140 is further used as the condensing solvent. To do this, the bio-oil component/solvent solution is directed back to the primary condenser 130 via the recirculator 142 as the condensing solvent for further condensation. Examples provide for the system to be operated, among other possibilities, as a batch or a continuous process. In a batch process, the bio-oil component/solvent solution mixture tank 140 is filled with the pure solvent to a level corresponding to the fraction of solvent in the final bio-oil component/solvent solution mixture. A portion of the solvent is transferred to the primary condenser 130 to condense a first portion of bio-oil components. The resulting bio-oil component/solvent solution is continually transferred back to the primary condenser 130 until the liquid level in the bio-oil component/solvent solution mixture tank has reached the filled mark, giving a final bio-oil component/solvent solution mixture with an optimum bio-oil component/solvent ratio. The recirculator is stopped and the final bio-oil component/solvent solution is entirely transferred to solvent extraction tank 150. In a continuous process, the bio-oil component/solvent solution may be slowly bled to the solvent extraction tank 150 while fresh or recycled condensing solvent is mixed with the bio-oil component/solvent solution, and this mixture is then introduced to the condensation system. For one embodiment, during a continuous process, a volume level and concentration of the mixture is kept constant.

Embodiments recognize that, after condensation by condensing solvent, desirable components (e.g. bio-oil components) or undesirable components (e.g. impurities) may still be present in gaseous, liquid or other forms. As such, the embodiment of FIG. 1 includes the secondary condenser 134 to receive a secondary stream from the primary condenser 130 for further condensation. Small quantities of the solvent may be present in the secondary stream 136 where, for example, a solvent has a relatively high boiling point. The solvent can be separated or extracted from the secondary condenser 134 by the solvent extraction system and then returned to the quenching process.

By adjusting the exit temperature of the primary condenser 130 it is possible to selectively extract bio-oil components from the bio-oil component/solvent solution. For example, by controlling a gas outlet exit temperature of the primary condenser 130 to about 125 degrees C., it is possible to remove the acetic acid, water, methanol, and all other light chemical species having a boiling point inferior to the set temperature. This results in an anhydrous bio-oil component/solvent solution containing little organic acids which can be stripped during the solvent recycling step.

When the bio-oil component/solvent solution is directed into the solvent extractor 150, the condensing solvent can be removed by heating and condensing the vapors either by atmospheric or reduced pressure distillation, evaporation, and flash evaporation, or other methods. The bio-oil component/solvent solution can be cooled or the heat absorbed from the primary condenser 130 can be used beneficially to help in solvent extraction 150. The solvent is then usually, but not necessarily, purified further before being sent back to the primary condenser 130. Although the solvent can be extracted in its totality, the resulting bio-oil components solution can also contain a fraction of the condensing solvent in order to improve its physicochemical characteristics, like viscosity. Alternatively, another solvent can also be added to improve the characteristics of the bio-oil component solution. This resulting bio-oil component solution or concentrate is chemically and physically stable and can be stored, blended or further processed while maintaining chemical properties.

Method Description

Figure 2:
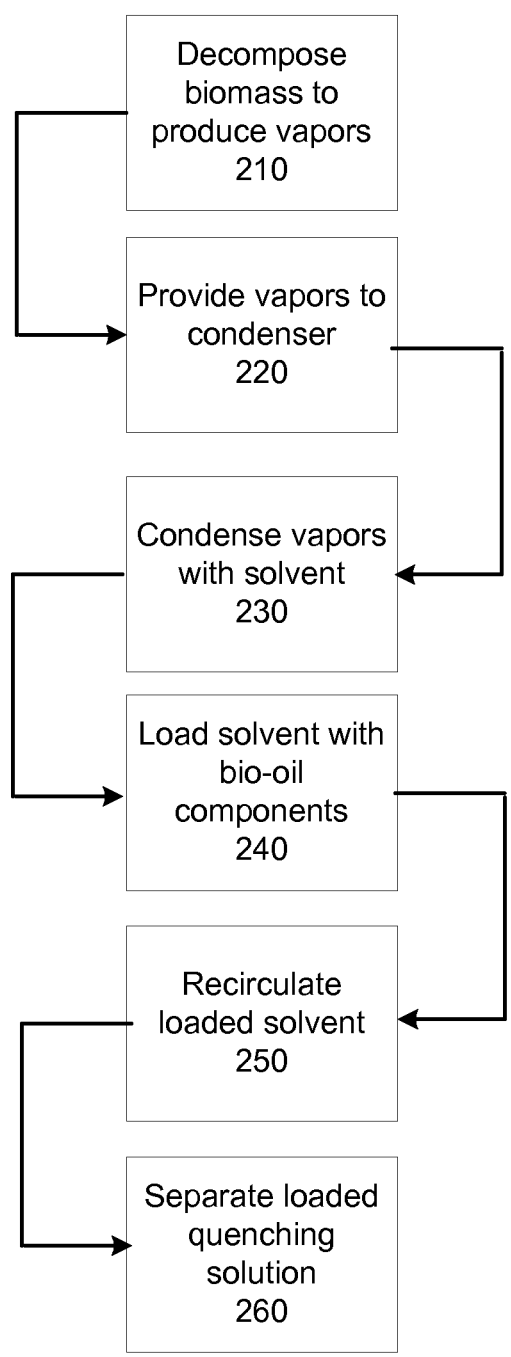
FIG. 2 illustrates a method for condensing bio-oil components from decomposed material fumes.

FIG. 2 illustrates a method for using a solvent to obtain bio-oil components from thermally decomposed material fumes. Reference is made to the embodiment of FIG. 1 in describing elements of FIG. 2.

At (210), a material is thermally decomposed to produce vapors. As described regarding FIG. 1, the vapors may include components which, when condensed (e.g. quenched), produce bio-oil components. For example, with reference to FIG. 1, a pyrolyzer may be used to decompose the material in the absence of oxygen to produce the vapors. In an example, the vapors produced in (210) can be obtained by heating the material (e.g. by exposure to a heating rate of 10,000 degrees Celsius/minute) without oxygen so that the material decomposes, producing gases.

At (220), the vapors are provided to a condenser, such as a quenching reactor. The quenching reactor cools the gases from (210) by, for example, exposure to a quenching solution. Examples of quenching reactors include a condenser, such as described in FIG. 1, provided with a solvent. Among other forms, the quenching solution may be a pure solvent (e.g. substantially of a single kind of compound), a mixture of different compounds, or a loaded solvent (e.g. including having been exposed to, and loaded, with bio-oil components as more fully described below in (230) and (240)).

Further referring to FIG. 2, after being provided to the quenching reactor, the heated vapors are quenched at (230) by exposure to the quenching solution, and the quenching solution is loaded with bio-oil components from the heated vapors at (240). The quenching solution, material and condenser may be selected or configured so that particular components are loaded into the solvent. For example, aspects of the steps described above at (210) through (230) can be varied for production of a particular solvent at (240). By way of example, at (210) the injection rate of the solvent and temperature of the quenching solution may be manipulated by the temperature controller to control the quantity and quality of the resulting loaded solution. Moreover, the temperature can be controlled to separate undesired chemical species.

At (250) the loaded solvent having bio-oil components is recirculated to further quench vapors. Examples provide for (230)-(250) to be performed, among other possibilities, as a batch or a continuous process. In a batch process, once a target concentration of chemical species is attained, the loaded solvent is transferred to the solvent extraction tank or system. In a continuous process, the loaded solvent is slowly bled to the solvent extraction tank or system while fresh or recycled solvent is mixed with the loaded solvent, and this mixture is then introduced to the quenching system. During a continuous process a level and concentration of the mixture is kept constant.

The solvent can then be separated from the bio-oil components for reuse, and for use of the bio-oil components, at (260).

FIG. 3 illustrates further detail for one specific quenching method corresponding to the condensing step 230 described above in FIG. 2. The quenching process involves introducing bio-oil component gases into a quenching reactor, at 302, at a temperature selected between 350-750 degrees. Solvent may then be introduced into the reactor, at 304, at a temperature that may be based on a temperature of captured bio-oil components from the quenching process, more fully explained below. The solvent may then be sprayed or otherwise rapidly drawn into contact with the bio-oil component vapor, at 306. The resulting exchange of heat results in the condensation of a large portion of the bio-oil component vapor to bio-oil components liquid.

Further referring to FIG. 3, once the bio-oil components condense into liquid, it is then captured, at 308, and the resulting temperature monitored, at 310. For some embodiments, a resulting temperature of about 125 degrees C. results in an optimal extraction of desired bio-oil components liquid from the vapor. A determination is carried out, at 312, as to whether the captured liquid is approximately 125 degrees C. If so, then no temperature adjustments are carried out on newly fed solvent into the quenching reactor. Should the temperature not be approximately 125 degrees C., then a temperature adjustment is made, at 314, to increase the temperature of the solvent (if the resulting captured liquid is less than 125 degrees) or reduce the temperature of the solvent (if the resulting captured liquid is higher than 125 degrees C.). This temperature control mechanism optimizes the volume and quality of bio-oil components liquid extracted during each quenching operation.

EXAMPLE

For one specific example of system operation consistent with the disclosure above, a material in the form of waste wood was directed into a flash pyrolysis oven where it was rapidly heated at a rate in excess of 10,000° C./min up to about 500-550° C. The pyrolysis gases generated were rapidly removed and separated from hot biochars and directed, through a heated duct kept near 500° C., to the quencher. There, the pyrolysis vapors were sprayed-in-flight with a relatively cold mixture of condensed/quenched bio-oil components in undecane. The condensed/quenched resulting liquid dropped into the primary quencher tank and was kept at about 125° C., while the unquenched chemical species having a boiling point inferior to 125° C. went through the quencher tank to exit to a secondary quencher/condenser for collection. From the secondary quencher/condenser, the non-condensable gases were directed to a thermal oxidizer, returned to the process for heat generation, for the generation of other chemicals from catalysts, used elsewhere in the plant operation or transported off plant for other usage. The resulting concentration in the primary quencher tank was maintained at about 50% bio-oil components/undecane.

At the same rate that the 50% bio-oil components/undecane solution was removed from the quencher tank, pure undecane was mixed with the 50% bio-oil components/undecane before introduction to the quenching zone. The liquid level in the quencher tank was kept constant. The 50% bio-oil components/undecane solution removed from the quenching tank was directed to the solvent extraction system while keeping it at 125° C. The solvent extraction system was maintained at a constant temperature for the undecane to evaporate at about 190-200° C. Alternatively, a vacuum system could be used to extract the undecane and possibly use less energy than normal distillation at ambient pressure. The totality of the undecane was extracted. The resulting bio-oil components were cooled and stored for future blending or transformation. The undecane extracted could be further purified and then stored or returned for further quenching.

In such an embodiment, undecane is a pure solvent so its extraction can be done at a single temperature which is better for process control. When the process uses a pure solvent, no residues are left to accumulate in the system and the final product.

The utilization of an alkane as a co-solvent precipitates chemical species responsible for unacceptable levels of micro-carbon residues in the final blend. Moreover, in cases where a small quantity of solvent is still present in the final product, the gel point of undecane is significantly low(−25° C.) to make the product compatible in environments with sub-zero temperatures.

The system, apparatus, and methods described above lend themselves well to extracting a purified form of bio-oil components liquid that may be mixed with, for example, diesel at fairly high mixture percentages. This is due in large part on the purity of the bio-oil components via the system and methods described herein, which results in lower residues forming during combustion of a purified bio-oil component/diesel fuel mixture. As a result, diesel mixed with a high percentage of bio-oil components may pass standards mandated by diesel fuel standards such as ASTM D975.

Those skilled in the art will appreciate the benefits and advantages afforded by the embodiments disclosed herein. By providing a recirculator to recycle a bio-oil component solvent mixture in a condensing process as well as extracting and recycling the solvent, significant logistical and cost savings may be realized in the extraction of bio-oil components in a pyrolysis system. Further, by controlling the temperature of the solvent based on a desired end-temperature, an optimal extraction during condensation may be attained.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the invention is not limited to those precise examples. As such, many modifications and variations will be apparent to practitioners skilled in this art. Accordingly, it is intended that the scope of the invention be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude the inventor from claiming rights to such combinations.

What is claimed is:

1. A system for pyrolyzing material, the system comprising:
    a pyrolyzer;
    a primary condenser, coupled to the pyrolyzer and configured to receive pyrolytic vapors from the pyrolyzer, and further configured to condense the pyrolytic vapors by contacting the pyrolytic vapors with a non-polar solvent, to form a condensed liquid such that the condensed liquid is phase separated into at least one bio-oil component originating from the pyrolytic vapors and a non-polar solvent component not originating from a pyrolysis process;
    a capture vessel to receive the condensed liquid;
    a recirculator coupled to the capture vessel and the primary condenser, the recirculator configured to provide at least a portion of the non-polar solvent component as the non-polar solvent used in the primary condenser; and
    a temperature controller coupled to the primary condenser to control a temperature of the non-polar solvent.

2. The system according to claim 1, further comprising:
    an extraction system to extract the non-polar solvent component from the condensed liquid.

3. The system according to claim 2, wherein the extracted non-polar solvent component or bio-oil component is recycled for use in the primary condenser.

4. The system according to claim 2, wherein the extraction system operates to extract the non-polar solvent component from the condensed liquid in a batch or continuous basis.

5. The system according to claim 2, wherein the extraction system comprises one from the group of an atmospheric or reduced pressure distiller, evaporator, or flash evaporator.

6. The system according to claim 2, wherein the extraction system is operable to return extracted non-polar solvent directly to the primary condenser or into a storage container.

7. The system according to claim 2, wherein the extraction system replaces the extracted non-polar solvent partially or in totality with a replacement non-polar solvent to be directed to the primary condenser.

8. The system of claim 1, wherein the non-polar solvent comprises one or more from the group including alkanes, alkenes, aromatics, aldehydes, fatty acids, fatty esters, triglycerides, esters, their derivatives, and a combination thereof.

9. The system of claim 1, wherein the temperature controller controls the temperature of the condensed liquid.

10. The system of claim 1, wherein the temperature of the non-polar solvent introduced to the primary condenser is adjusted based on a threshold temperature of the condensed liquid.

11. The system of claim 1, wherein the primary condenser comprises a quenching reactor.

12. The system of claim 1, further comprising a processor to process uncondensed gases.

13. The system of claim 1, further including a secondary condenser coupled to the primary condenser to receive uncondensed bio-oil component vapors from the primary condenser, the secondary condenser having an output coupled to the capture vessel.

14. The system of claim 13, wherein a secondary recirculator feeds back a portion of the condensed liquid from the capture vessel to the secondary condenser to condense the uncondensed bio-oil component vapors.

\* \* \* \* \*